March 4, 1969 YASUTSUGU YOKOHAMA 3,431,078
RESPIRATION MEASURING APPARATUS
Filed Oct. 27, 1966
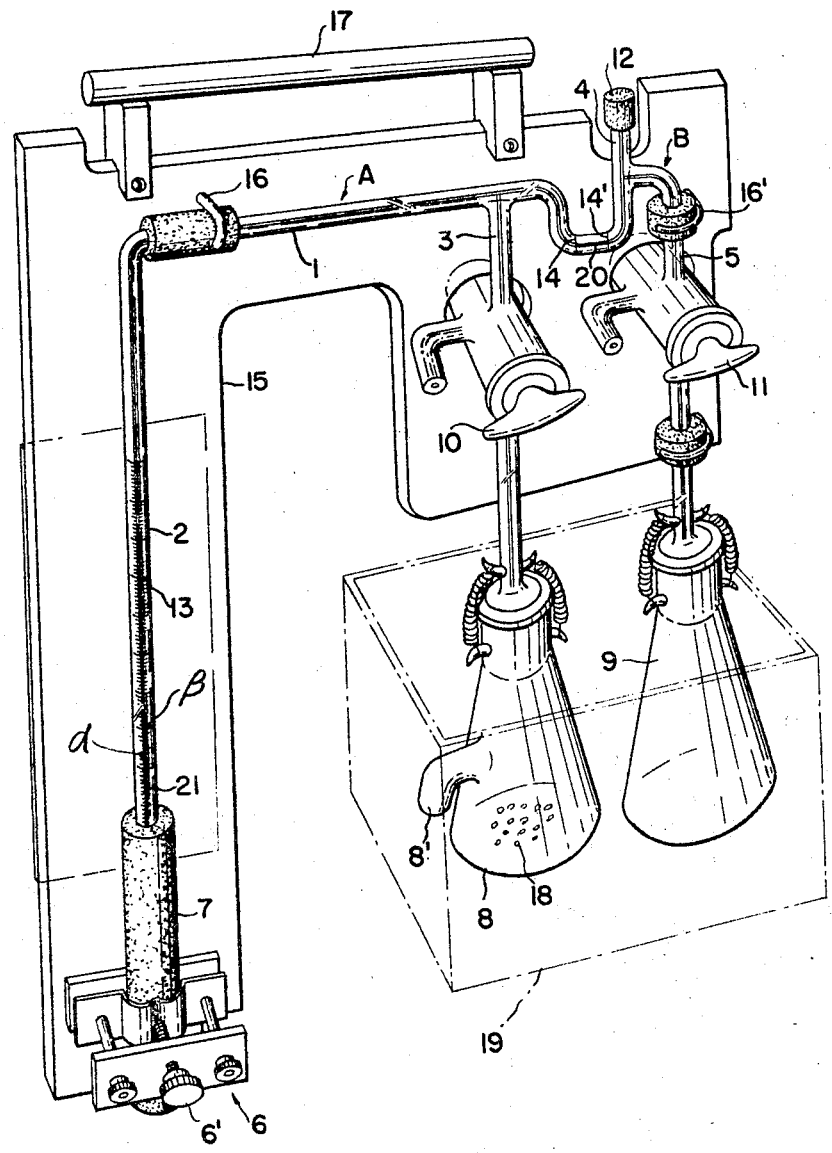

United States Patent Office 3,431,078
Patented Mar. 4, 1969

3,431,078
RESPIRATION MEASURING APPARATUS
Yasutsugu Yokohama, Chiba-ken, Japan, assignor to Yasutsugu Yokohama, Chiba-ken, and Nikko Kagaku Kabushiki Kaisha, Tokyo, Japan, a corporation of Japan
Filed Oct. 27, 1966, Ser. No. 590,075
U.S. Cl. 23—254     4 Claims
Int. Cl. G01n 31/00

This invention relates to a respiration measuring apparatus and has one object to provide a novel respiration measuring apparatus which enables easy and accurate measurement and calculation.

Further object of this invention is to provide a new and improved respiration measuring apparatus which permits accurate and rapid direct reading.

A still further object of this invention is to install a number of such apparatus in a common water tank, thus saving the space.

These and other objects of this invention can be attained by providing a respiration measuring apparatus comprising a main capillary tube provided with a scaled capillary section, a liquid reservoir connected to said scaled capillary tube section and provided with a compression adjusting means, a first branch capillary tube branched from said main capillary tube and connected to a reaction vessel, a second branch capillary tube branched from said main capillary tube at a point more remote from said scaled capillary section than said first branch capillary tube, a control vessel connected to said second branch capillary tube and means to introduce a relatively small quantity of liquid into said main capillary tube.

This invention can be more fully understood from the accompanying drawing in which a single figure shows a perspective view of a respiration meter constructed in accordance with the teaching of this invention.

Referring now to the accompanying drawing there is shown a main capillary tube 1 having a vertical section provided with a scale 13. To the right hand end of the capillary tube 1 are connected a first branch capillary tube 3 leading to a reaction vessel, a branch capillary tube 4 for effecting titration and a second branch capillary tube 5 leading to a control vessel 9, said branch capillary tubes being connected to said main tube 1 in the order mentioned. A liquid reservoir 7 provided with a compression adjusting means 6 is connected at the lower end of the scaled section 2. A reaction vessel 8 having a branch pipe 8' is connected to the lower end of the capillary tube 3 whereas a control vessel 9 is connected to the lower end of the capillary tube 5, respectively through three way cocks 10 and 11. The free end of the titration capillary tube 4 is normally closed by a removable cap 12. The scale 13 on the capillary tube section 2 is proportioned to the volume of the capillary tube and fixed marker lines 14 and 14' are provided for the portion of the main capillary tube 1 to which the branched capillary tube 4 for titration is connected. Various components mentioned above are suitably mounted on a supporting board 15 by means of bent rods 16 and the supporting board being hung by a hanger 17.

In operation, a respirator 18 which suctions oxygen and exhausts carbon dioxide gas is disposed in the reaction vessel 8, a quantity of caustic soda is put in the branch pipe 8' of the reaction vessel, and a small quantity of water is poured into the control vessel 9. Thereafter these vessels are connected to branched capillary tubes 3 and 5, respectively and are then immersed in a thermostatic water tank 19. If desired, after venting the three way cocks to the atmosphere, these cocks 10 and 11 are then communicated with vessels 8 and 9 respectively and a drop or drops of liquid is introduced into the capillary branch 4 for titration, by means of an injection needle, for instance, to fill the space between marker lines 14 and 14'. Simultaneously therewith, an adjustable screw 6' of the compression adjusting means of the liquid reservoir 7 is operated to cause the liquid in the scaled capillary tube 2 to rise to a predetermined point thereof. By this means carbon dioxide gas exhausted from the respirating body 18 will be absorbed by caustic soda contained in the auxiliary pipe 8', thus decreasing the pressure in capillary tubes on the side A of the reaction vessel 8. As a result, the liquid drop in the main capillary tube 1 will be moved toward the reaction side whereby the pressure on the reaction side A and the pressure on the control side B will be always maintained equal. After a definite time interval the level of the liquid column in the capillary tube section 2 is elevated from the point $\alpha$ to a point $\beta$ by the manipulation of the compression adjusting means 6 to restore the liquid drop to the original position indicated by marker lines 14 and 14'. Thus, the quantity of respiration could be determined from the difference between liquid levels $\alpha$ and $\beta$.

Where it is desired to measure the quantity of respiration as in fermentation, the auxiliary tube 8' of the reaction vessel is not necessary and in contrast to the foregoing example, the liquid drop 20 is moved to the control side B. Thus, by returning the liquid 21 to the reservoir 7 by the manipulation of the compression adjusting means 6 the liquid drop 20 is moved toward the reaction side A and when it restores the position indicated by marker lines 14 and 14', the difference in the levels of the liquid column indicates the quantity of respiration.

As described hereinabove, this invention provides a respiration meter comprising a main capillary tube having a section with a scale, a branch capillary tube for a reaction vessel, a branch capillary tube for titration, and a branch capillary tube for a control vessel which are connected to said scaled capillary section in the order mentioned, a liquid reservoir connected to said scaled capillary section and provided with a compression adjusting means, a reaction vessel connected to said branch capillary tube for said vessel, a control vessel connected to said branch capillary tube for said control tube and means to introduce liquid drops into said branch capillary tube for titration.

In a conventional respiration meter wherein a C-shaped capillary tube is used it was impossible not only to accurately measure the quantity of respiration unless the volumes of the vessels and the capillary tube on the reaction side and control side, respectively which are on the opposite sides of the liquid drop are equal but also to effect simple calculation.

In contrast, with the respiration measuring device of the construction described above, measurement of respiration can be made very accurately and rapidly simply by adjusting pressures on the reaction side as well as control sides by the manipulation of the compression adjusting means for the liquid reservoir of the scaled capillary tube whereby to directly observe the movement of the liquid in the scaled capillary section without regard to the difference in volume on the reaction side and that on the control side. Further it is not only possible to oscillate the measuring device in a water tank but also possible to immerse a number of such devices in a common tank to perform simultaneous measurement.

While the invention has been explained by describing a particular embodiment thereof, it will be apparent that improvements and modifications may be made without departing from the scope of the invention as defined in the appended claims. For example, the main capillary tube 1 has been shown as being horizontal, it may be mounted obliquely with any angle of inclination.

What is claimed is:
1. A respiration measuring apparatus comprising a main capillary tube provided with a scaled capillary section, a liquid reservoir connected to scaled capillary tube, said reservoir being provided with a compression adjusting means, a first branch capillary tube branched from said main capillary tube and connected to a reaction vessel, a second branch capillary tube branched from said main capillary tube at a point more remote from said scaled capillary section than said first branch capillary tube, a control vessel connected to said second branch capillary tube and means to introduce a relatively small quantity of liquid into said main capillary tube.

2. The respiration measuring apparatus according to claim 1 wherein said reaction vessel is provided with an auxiliary tube.

3. The respiration measuring apparatus according to claim 1 wherein a letter U-shaped section is formed in said main capillary tube between said first and second branch capillary tubes to receive said liquid.

4. The respiration measuring apparatus according to claim 3 wherein said U-shaped section is provided with marker lines to indicate the movement of said liquid.

References Cited

UNITED STATES PATENTS

| | | | |
|---|---|---|---|
| 2,026,842 | 1/1936 | Matuszak | 23—254 |
| 2,680,060 | 1/1954 | Natelson | 23—232 XR |
| 3,313,157 | 4/1967 | Gilson | 23—254 XR |

MORRIS O. WOLK, *Primary Examiner.*

R. M. REESE, *Assistant Examiner.*

U.S. Cl. X.R.

23—259; 73—401